(12) United States Patent
Kouyama et al.

(10) Patent No.: US 8,351,149 B2
(45) Date of Patent: Jan. 8, 2013

(54) CARTRIDGE SYSTEM

(75) Inventors: Tomoaki Kouyama, Nagoya (JP); Satoru Goto, Nagoya (JP); Takayuki Kakuta, Nagoya (JP); Hiroaki Kawasaki, Nagoya (JP); Takashi Ishidoshiro, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 67 days.

(21) Appl. No.: 13/005,857

(22) Filed: Jan. 13, 2011

(65) Prior Publication Data

US 2011/0170393 A1 Jul. 14, 2011

(30) Foreign Application Priority Data

Jan. 13, 2010 (JP) .................................. 2010-005131

(51) Int. Cl.
*G11B 33/02* (2006.01)
(52) U.S. Cl. .................................................... 360/99.14
(58) Field of Classification Search .................. None
See application file for complete search history.

(56) References Cited

U.S. PATENT DOCUMENTS

| 6,002,660 | A | * | 12/1999 | Ikegame | 720/631 |
| 6,014,294 | A | * | 1/2000 | Fujisawa | 360/133 |
| 7,656,608 | B1 | * | 2/2010 | Eichel | 360/92.1 |
| 2004/0252408 | A1 | * | 12/2004 | Oba et al. | 360/97.02 |

FOREIGN PATENT DOCUMENTS

| JP | 2004-86674 | 3/2004 |
| JP | 4253887 | 2/2009 |

OTHER PUBLICATIONS

U.S. Appl. No. 13/005,785, filed Jan. 13, 2011, Kouyama, et al.

\* cited by examiner

*Primary Examiner* — Mark Blouin
(74) *Attorney, Agent, or Firm* — Oblon, Spivak, McClelland, Maier & Neustadt, L.L.P.

(57) ABSTRACT

When inserted in the slot 150 of the storage unit main body 100, the cartridge-type HDD 200*a* is situated with the slight clearance between the protrusion 164 of the slot 150 and the upper surface of the cartridge-type HDD 200*a*. In addition, the protrusion 166 of the slot 150 is loosely fitted in the recess 216 of the cartridge-type HDD 200*a*.

12 Claims, 7 Drawing Sheets

CARTRIDGE SYSTEM

CROSS REFERENCE TO RELATED APPLICATION

This application is based upon and claims the benefit of priority from, the prior Japanese Patent Application No. 2010-5131 filed on Jan. 13, 2010; the entire contents of which are incorporated herein by reference.

BACKGROUND OF THE INVENTION

1. Field of the Invention

This invention relates to a cartridge system which includes a cartridge and a main body apparatus having a slot into which the cartridge is inserted.

2. Description of the Related Art

Recently, a proposal has been made that a storage medium such as a hard disk drive (HDD) should be used in the form of a cartridge inserted in a main body apparatus such as a reproduction apparatus. There may be a variety of such cartridges having different shapes. Therefore, the main body apparatus is usually provided with different types of slots adapted for different types of cartridges (for example, Japanese Patent Application Publication No. 2004-86674 and Japanese Patent No. 4253887).

However, if the main body apparatus needs to be provided with slots for different cartridge shapes, the main body apparatus must be inevitably large in size. Furthermore, if cartridge shapes are standardized later, the slots except for a slot for the standardized cartridge shape will be no longer used. To solve this problem, a single slot may be subjected to shared use among the differently shaped cartridges. However, the sharing of a single slot requires the single slot to have such a shape that a large-sized cartridge can be inserted. This still leaves a problem that it is difficult to position a small-sized cartridge in the course of insertion.

Accordingly, the object of this invention is to provide a cartridge system which facilitates the positioning of a cartridge in the course of insertion into a slot provided in a main body apparatus.

SUMMARY OF THE INVENTION

To solve the above-mentioned problem, this invention has the following features. First of all, according to a first feature of this invention, there is provided a cartridge system (NAS) comprising: a cartridge (cartridge-type HDD 200); and a main body apparatus (storage unit main body 100) having a slot (slot 150) into which cartridges different in thickness are insertable, wherein the slot comprises a first inner wall surface (first inner wall surface 161) and a second inner wall surface (second inner wall surface 162) facing the first inner wall surface, and further comprises a first protrusion (protrusion 164) projecting laterally and located on the first inner wall surface, and the cartridge has such a shape that the surface of the cartridge facing the first inner wall surface does not collide with the first protrusion when the cartridge is inserted into the slot.

In this cartridge system, the first inner wall surface of the slot is provided with the first protrusion projecting laterally. Therefore, when the cartridge is inserted into the slot, the vertical movement of the cartridge is restricted. This makes it easy to position the cartridge. In addition, the cartridge has such a shape that the surface of the cartridge facing the first inner wall surface does not collide with the first protrusion when the cartridge is inserted in the slot. Therefore, the existence of the first protrusion does not hinder the cartridge from being inserted into the slot.

According to a second feature of this invention, there is provided a cartridge system according to the first feature described above, wherein the cartridge comprises a first recess (recess 214) located in the position corresponding to that of the first protrusion when the cartridge is inserted in the slot.

According to a third feature of this invention, there is provided a cartridge system according to the first or second feature described above, wherein the first protrusion is located in such a position that it prevents the unwanted vertical movement of a cartridge inserted in the slot, the cartridge having the smallest thickness among the cartridges different in thickness.

According to a fourth feature of this invention, there is provided a cartridge system according to the first or second feature described above, wherein the slot further comprises a second protrusion (protrusion 166) on the second inner wall surface, and the cartridge further comprises a second recess (recess 216) in the position corresponding to that of the second protrusion when the cartridge is inserted in the slot.

According to a fifth feature of this invention, there is provide a cartridge system according to the fourth feature described above, wherein the first protrusion and the second protrusion are respectively provided on the inner wall surfaces of the slot in asymmetrical positions.

According to a sixth feature of this invention, there is provided a cartridge system according to the first or second feature described above, wherein the first inner wall surface is shaped like a waveform having a first wavelength, the second inner wall surface is shaped like a waveform having a second wavelength which is different from the first wavelength, the surface of the cartridge which faces the first inner wall surface when the cartridge is inserted in the slot is shaped like a waveform having a third wavelength corresponding to the first wavelength, and the surface of the cartridge which faces the second inner wall surface when the cartridge is inserted in the slot is shaped like a waveform having a fourth wavelength corresponding to the second wavelength.

According to a seventh feature of this invention, there is provided a cartridge system according to the sixth feature described above, wherein each of the first to fourth wavelengths is a wavelength which changes in a predetermined range.

According to an eighth feature of this invention, there is provided a cartridge system according to the first or second feature described above, wherein the slot further comprises a third protrusion (restriction member 168) in any one of its four corners, and the cartridge further comprises a third recess (notch 218) in the position corresponding to that of the third protrusion when the cartridge is inserted in the slot.

According to a ninth feature of this invention, there is provided a cartridge system according to the eighth feature described above, wherein the third protrusion is an optically-transparent member.

The present invention makes it possible to easily achieve the positioning of the cartridge to be inserted into the slot provided in the main body apparatus.

DESCRIPTION OF THE EMBODIMENTS

Figure 1:
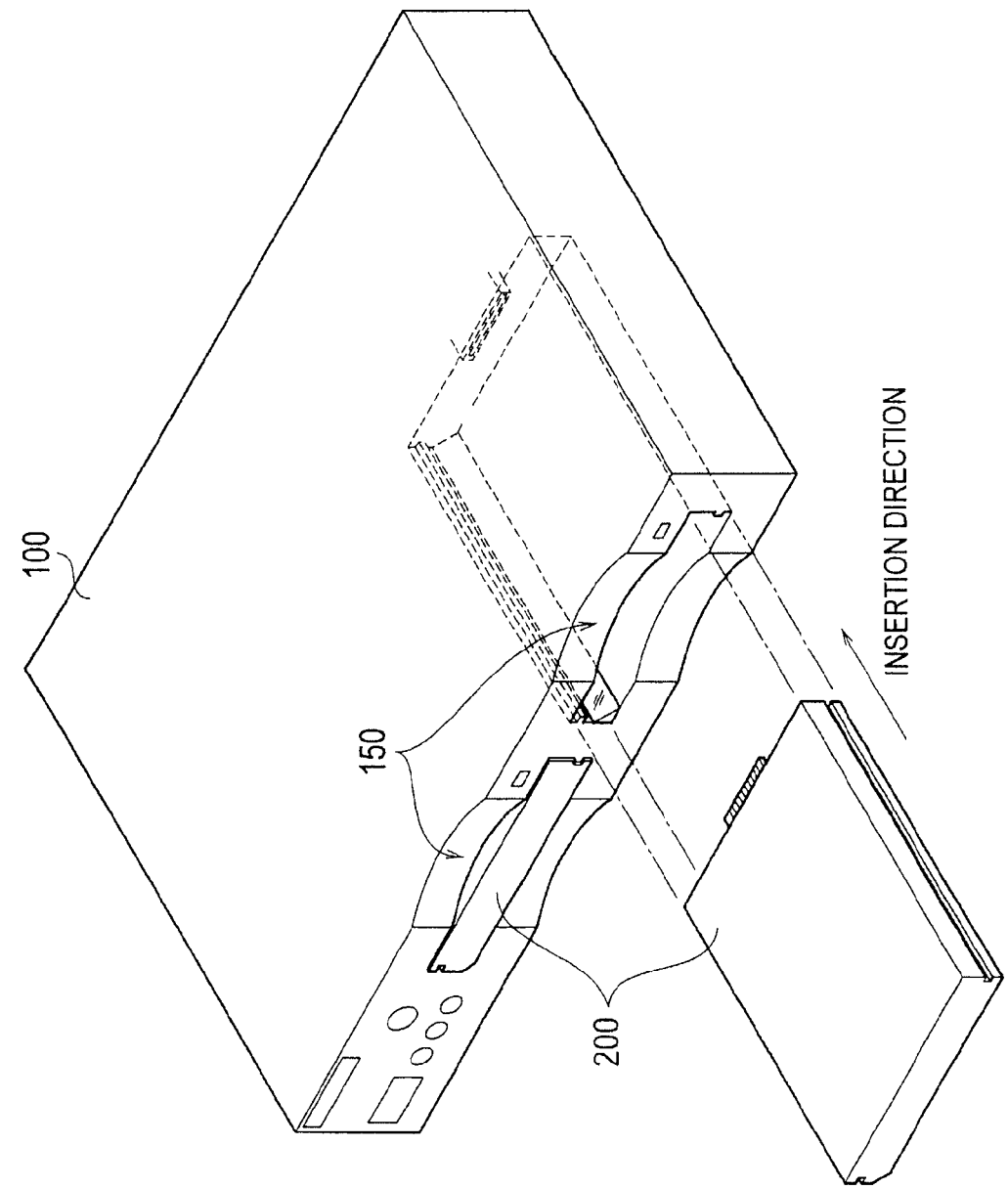
FIG. 1 is a perspective view of an external appearance of an NAS according to an embodiment of this invention.

Embodiments of this invention will be described below with reference to the drawings. In the drawings of the embodiments, the same or similar reference symbols denote the same or similar parts.

It should be noted that the drawings are schematic and the ratios of dimensions are different from actual ones.

In the following, described is an embodiment in which a cartridge system according to this invention is applied to an NAS as a network-adapted storage unit.

The NAS according to the embodiment includes a detachable storage medium. A cartridge using an HDD using a magnetic disc is shown as an example of the storage medium. However, a solid-state drive (SSD) using a non-volatile memory or an optical drive may be used instead of the HDD.

Hereinafter, description will be made of (1) an overall configuration of the NAS, (2) a detailed configuration of the NAS, (3) operation/working-effects, and (4) other embodiments in this order named.

(1) Overall Configuration of the NAS

First of all, referring to FIGS. 1 and 2, descriptions will be made of the overall configuration of the NAS according to the embodiment.

Figure 2:
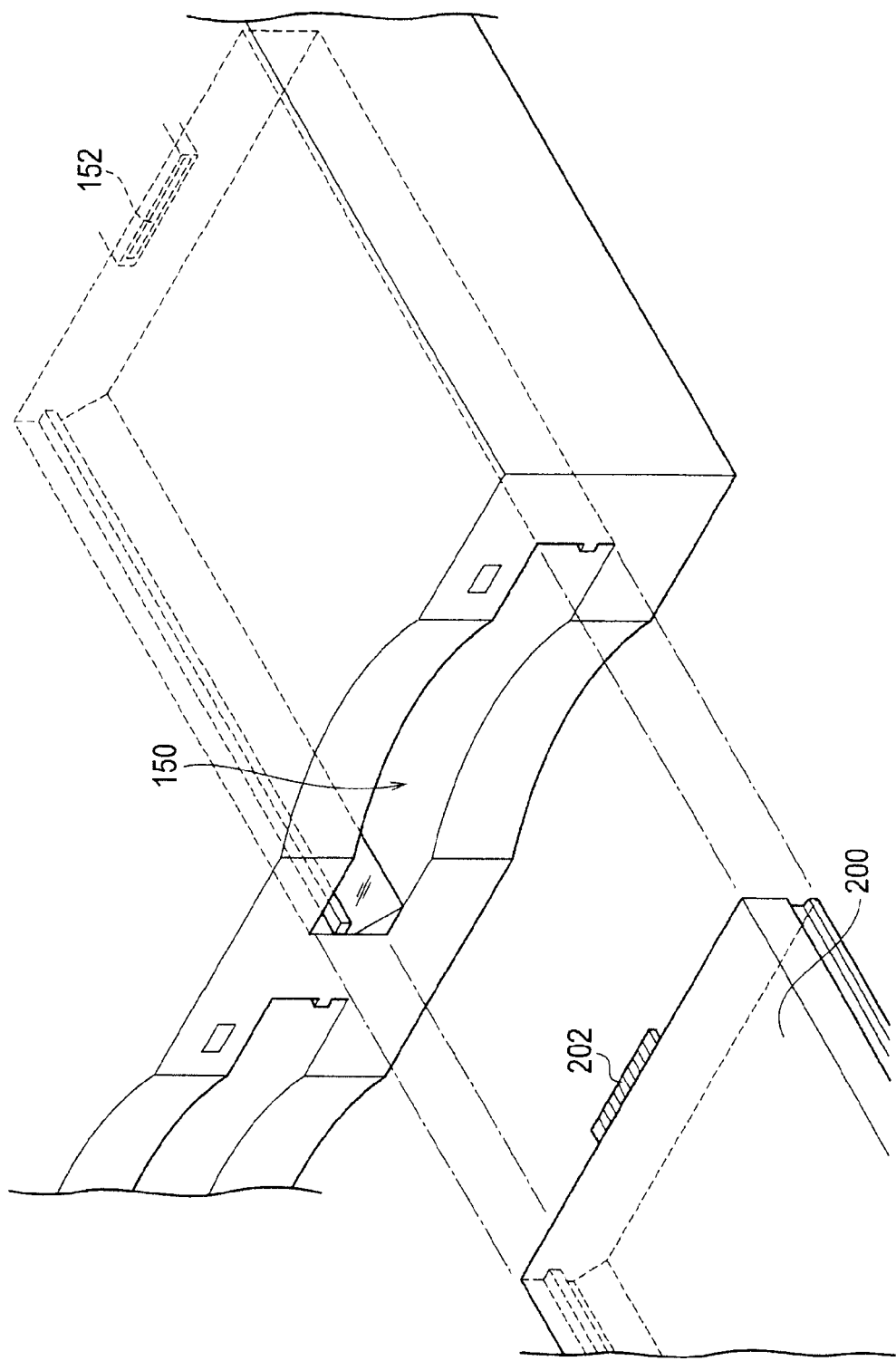
FIG. 2 is a perspective view of an external appearance of a slot and its vicinity in the NAS according to the embodiment of this invention.

FIG. 1 is a perspective view of an external appearance of the NAS according to the embodiment. FIG. 2 is a perspective view of an external appearance of a slot and its vicinity in the NAS according to the embodiment.

In this embodiment, the NAS consists mainly of a storage unit main body 100 as a main body apparatus, and a cartridge-type HDD 200 as a cartridge.

The storage unit main body 100 is provided with two slots 150. The cartridge-type HDD 200 is inserted into either of these two slots. Consequently, a connecter 152 provided in the storage unit main body 100 is connected to a connector 202 provided in the cartridge-type HDD 200. Once the connector 152 and the connector 202 are connected together, the storage unit main body 100 can perform data reading and writing with respect to the cartridge-type HDD 200 inserted in the slot 150.

The cartridge-type HDD 200 is an HDD housed in a cartridge and can be detachably mounted in the storage unit main body 100.

Because the cartridge-type HDD 200 is detachably mounted in the storage unit main body 100, if the memory capacity of the cartridge-type HDD 200 is insufficient, recording can be continued by another cartridge-type HDD 200. In addition, cartridge-type HDDs 200 can be selectively used depending on the attributes of data to be stored therein.

(2) Detailed Configuration of the NAS

Figure 3A:
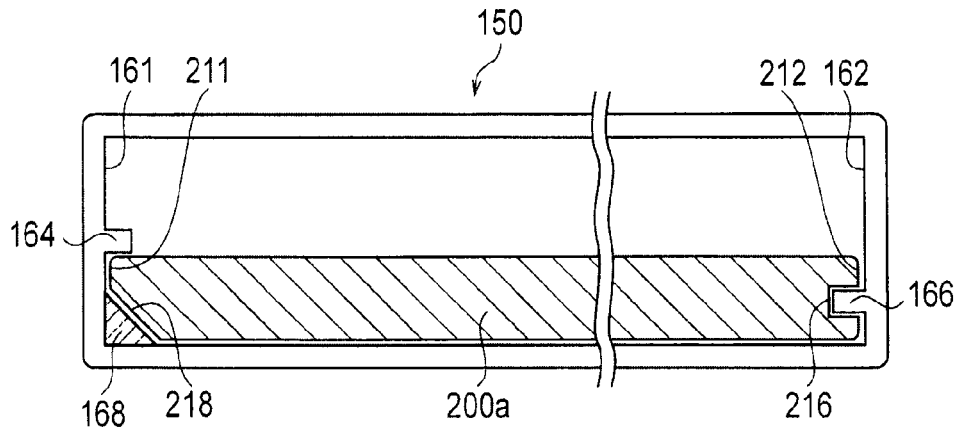
FIGS. 3A, 3B and 3C are diagrams each showing a first condition in which a cartridge-type HDD is inserted in a slot according to the embodiment of this invention.
Figure 3B:
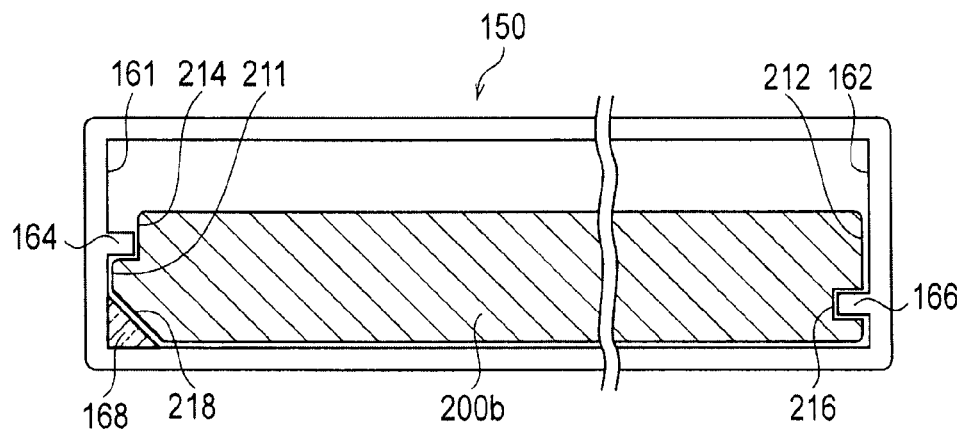
Figure 3C:
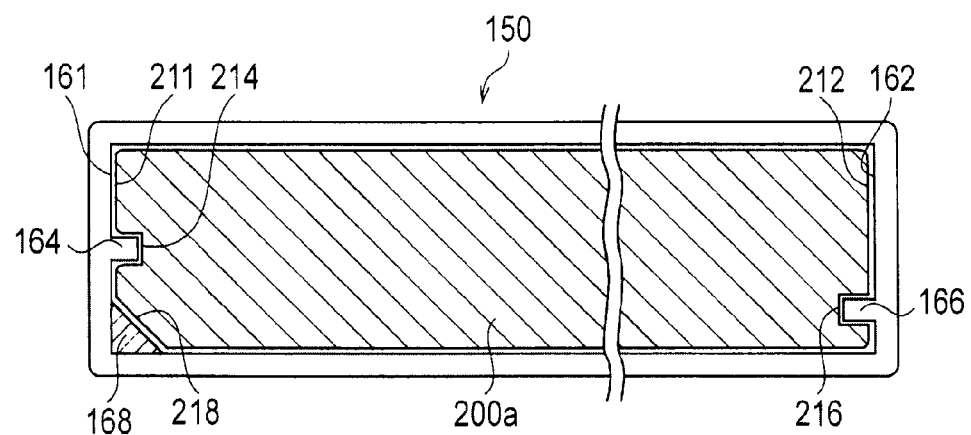

FIGS. 3A, 3B and 3C are diagrams showing a first condition in which the cartridge-type HDDs 200a, 200b, 200c are inserted in the slot 150.

As shown in FIGS. 3A, 3B and 3C, any one of three sorts of cartridge-type HDDs 200a, 200b, 200c whose thicknesses are different from one another can be inserted in the slot 150.

The cartridge-type HDDs 200a, 200b, 200c are identical in width and depth, but are different in thickness alone. For example, the cartridge-type HDD 200a is the smallest in thickness, e.g. 7.5 mm thick. The cartridge-type HDD 200c is the largest in thickness, e.g. 12.5 mm thick. The thickness of the cartridge-type HDD 200b is somewhere between the thicknesses of the cartridge-type HDD 200a and the cartridge-type HDD 200c, e.g. 9.5 mm thick.

As shown in FIGS. 3A to 3C, as a first protrusion, a protrusion 164 projecting inward is provided on a first inner wall surface 161 of the slot 150. As shown in FIG. 3A, this protrusion 164 is provided in such a position that a slight clearance is left between the protrusion 164 and the upper surface of the cartridge-type HDD 200a when the cartridge-type HDD 200a whose thickness is the smallest is inserted in the slot 150.

In addition, as shown in FIGS. 3A to 3C, as a second protrusion, a protrusion 166 projecting inward is provided on a second inner wall surface 162 of the slot 150, which is opposed to the first inner wall surface 161. As shown in FIG. 3A, this protrusion 166 is provided in a position lower than the upper surface of the cartridge-type HDD 200a when the cartridge-type HDD 200a is inserted in the slot 150. The protrusion 164 and the protrusion 166 are respectively provided on the inner walls of the slot 150 in the positions which are asymmetrical with respect to any point.

Furthermore, as shown in FIGS. 3A to 3C, as a third protrusion, a restriction member 168 shaped like a triangle column is provided in that one of the four corners of the slot 150 which is located at the lower end of the first inner wall surface 161. The restriction member 168 is an optically-transparent member.

As shown in FIGS. 3A to 3C, when each of the cartridge-type HDDs 200a, 200b, and 200c is inserted in the slot 150, a first side surface 211 is opposed to the first inner surface 161 and a second side surface 212 is opposed to the second inner surface 162.

As shown in FIG. 3B, as a first recess, a recess 214 is provided in the first side surface 211 in a position which is opposed to the protrusion 164 when the cartridge-type HDD 200b is inserted in the slot 150.

As shown in FIG. 3C as a first recess, a recess 214 is provided in the first side surface 211 in a position which is opposed to the protrusion 164 when the cartridge-type HDD 200c is inserted in the slot 150.

As shown in FIGS. 3A to 3C as a second recess, a recess 216 is provided in the second side surface 212 in a position which is opposed to the protrusion 166 when the cartridge-type HDDs 200a, 200b, 200c are inserted in the slot 150.

As shown in FIGS. 3A to 3C as a third recess, a chamfer 218 is provided in the first side surface 211 in a position which is opposed to the restriction member 168 when the cartridge-type HDDs 200a, 200b, 200c are inserted in the slot 150.

(3) Operation/Working-Effect

In the NAS described above, no matter which one of the three sorts of cartridge-type HDDs 200a, 200b, 200c different in thickness may be inserted into the slot 150, the position of the inserted cartridge-type HDD is fixed.

To put it concretely, as shown in FIG. 3A, when inserted in the slot 150 of the storage unit main body 100, the cartridge-type HDD 200a is situated with the slight clearance between the protrusion 164 of the slot 150 and the upper surface of the cartridge-type HDD 200a. In addition, the protrusion 166 of the slot 150 is loosely fitted in the recess 216 of the cartridge-type HDD 200a. Accordingly, the position of the cartridge-type HDD 200a inserted in the slot 150 is fixed.

As shown in FIG. 3B, when inserted in the slot 150 of the storage unit main body 100, the cartridge-type HDD 200b is situated stably with the recess 214 of the cartridge-type HDD 200b guided along the protrusion 164 of the slot 150. In addition, the protrusion 166 of the slot 150 is loosely fitted in the recess 216 of the cartridge-type HDD 200b. Accordingly, the position of the cartridge-type HDD 200b inserted in the slot 150 is fixed.

As shown in FIG. 3C, when inserted in the slot 150 of the storage unit main body 100, the cartridge-type HDD 200c is situated stably with the protrusion 164 of the slot 150 fitted loosely in the recess 214 of the cartridge-type HDD 200c. In addition, the protrusion 166 of the slot 150 is loosely fitted in the recess 216 of the cartridge-type HDD 200c. Accordingly, the position of the cartridge-type HDD 200c inserted in the slot 150 is fixed.

Moreover, the restriction member 168, together with the protrusions 164, 166, is provided in the slot 150. On the other hand, each of the cartridge-type HDDs 200a, 200b, 200c is provided with a chamfer 218 which slidably contacts the restriction member 168 when the cartridge-type HDD is inserted into the slot 150. This makes the inner walls of the slot 150 asymmetrical. In addition, the protrusion 164 and the protrusion 166 are provided on the inner wall surfaces of the slot 150 with their geometry as shown in FIGS. 3(a), 3(b) and 3(c). Therefore, when turned upside down, none of the cartridge-type HDDs 200a, 200b, 200c can be inserted into the slot 150. Accordingly, the wrong insertion is prevented.

Further, the restriction member 168 is of optically-transparent material. Therefore, if position opposite the opening of the slot 150 in the restriction member 168 is provided with a light source such as an LED for lighting in response to, for example, an access status, a write-enabled/disabled status and a communication status of the cartridge-type HDD 200a, light from the light source can be radiated to the outside. Accordingly, the user can know the various statuses of the cartridge-type HDD 200a from the radiating state of the light.

(4) Other Embodiments

As described above, the details of this invention have been disclosed by way of embodiment. However, it should not be understood that the description and drawings which constitute parts of this disclosure limit the invention. From this disclosure, various alternatives, examples, and operation techniques will be easily derived by those skilled in the art.

Figure 4A:
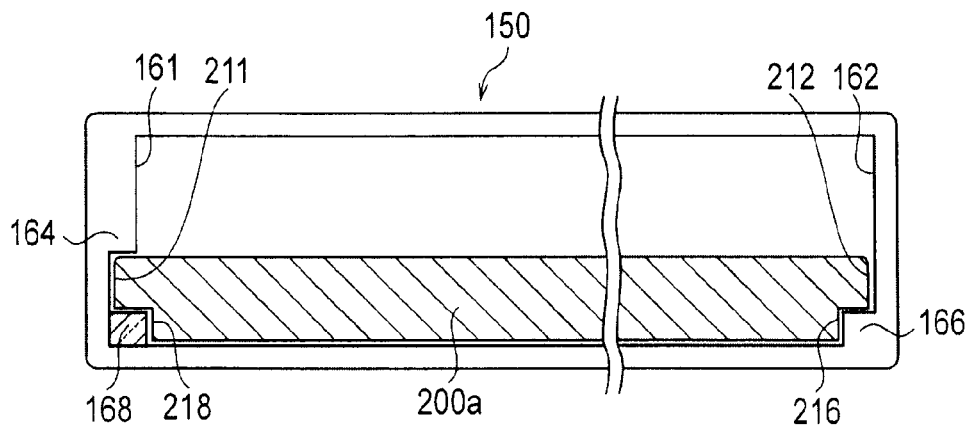
FIGS. 4A, 4B and 4C are diagrams each showing other examples of protrusions, a restriction member, recesses, and a chamfer.
Figure 4B:
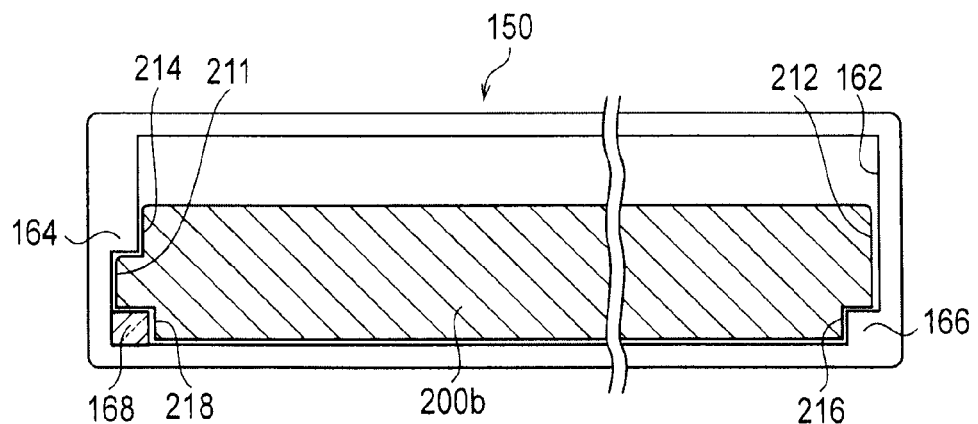
Figure 4C:
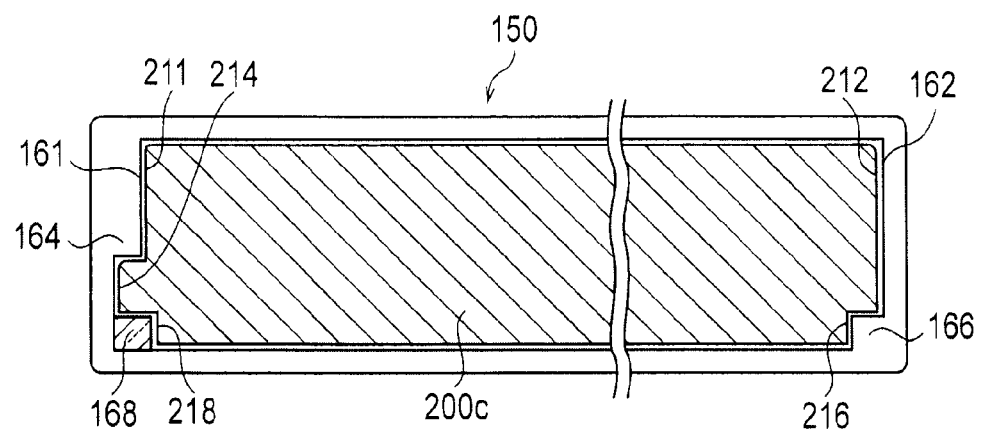

In the foregoing embodiment, the protrusions 164, 166, the restriction member 168, the recesses 214, 216 and the chamfer 218 have the shapes shown in FIGS. 3A, 3B and 3C. However, their shapes are not limited to those shown in FIGS. 3A, 3B and 3C, but may be as shown in FIGS. 4A, 4B and 4C.

Figure 5A:
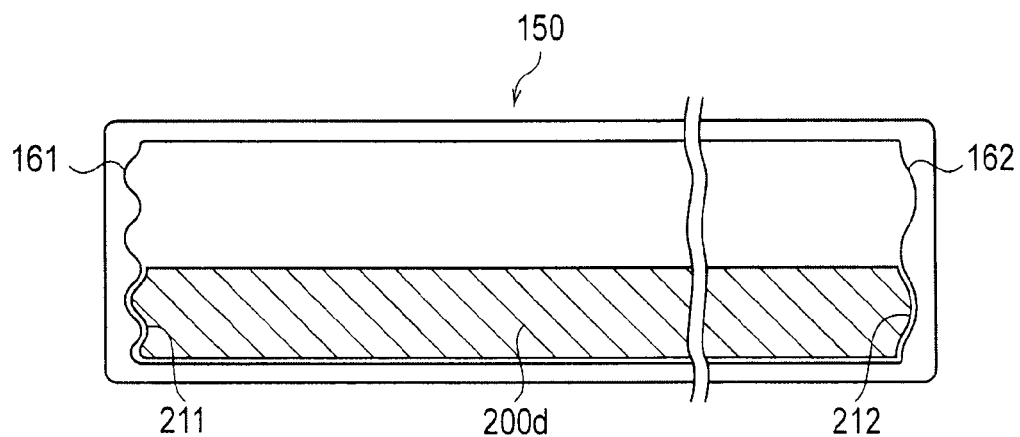
FIGS. 5A, 5B and 5C are diagrams each showing a second condition in which a cartridge-type HDD is inserted in the slot according to the embodiment of this invention.
Figure 5B:
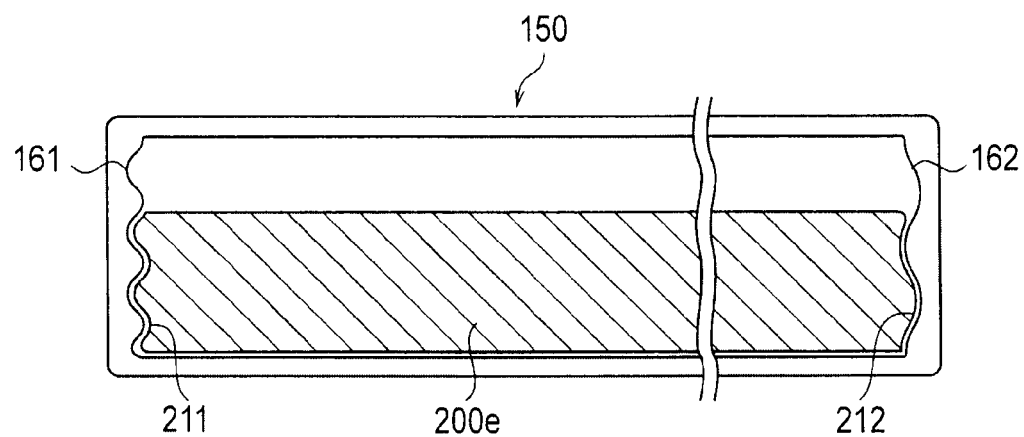
Figure 5C:
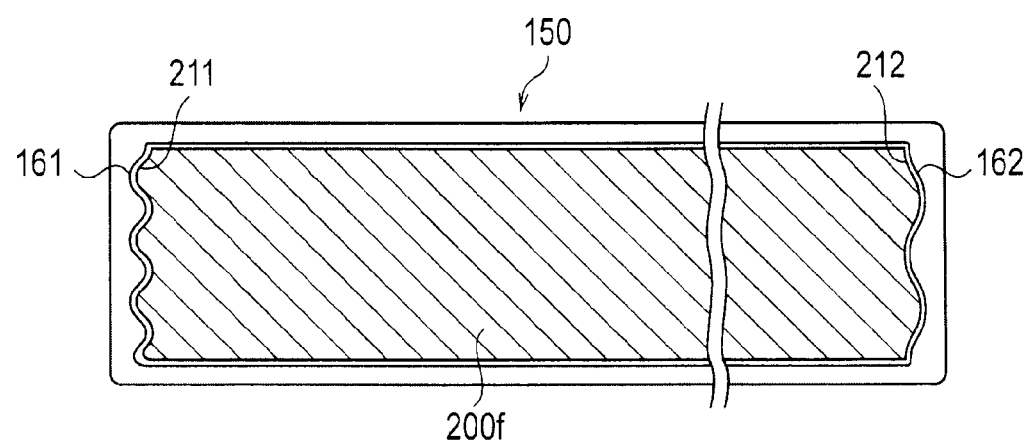

FIGS. 5A, 5B and 5C are diagrams showing a second condition in which the cartridge-type HDDs 200d, 200e, and 200f are inserted in the slot 150.

As shown in FIGS. 5A, 5B and 5C, any one of three sorts of cartridge-type HDDs 200d, 200e, 200f different in thickness can be inserted in the slot 150. The cartridge-type HDDs 200d, 200e, 200f are the same in width and depth, but are different in thickness alone.

The first inner wall surface 161 of the slot 150 is shaped like a waveform which has a first wavelength. In addition, the second inner wall surface 162 of the slot 150 is shaped like a waveform which has a second wavelength shorter than the first wavelength.

On the other hand, the first side surface 211 of each of the cartridge-type HDDs 200d, 200e, 200f is shaped like a waveform which has a third wavelength corresponding to the first wavelength in order that, when the cartridge-type HDD 200d, 200e or 200f is inserted into the slot 150, the first side surface 211 can be matched to the first inner wall surface 161 with a slight clearance interposed in between. In this respect, the third wavelength is substantially equal to the first wavelength. Furthermore, the second side surface 212 of each of the cartridge-type HDDs 200d, 200e, 200f is shaped like a waveform which has a fourth wavelength corresponding to the second wavelength in order that, when the cartridge-type HDD 200d, 200e or 200f is inserted into the slot 150, the second side surface 212 can be matched to the second inner wall surface 162 with a slight clearance interposed in between. In this respect, the fourth wavelength is substantially equal to the second wavelength.

As described above, the first inner wall surface 161 and the second inner wall surface 162 of the slot 150 are shaped like their respective waveforms which differ in wavelength; the first side surface 211 and the second side surface 212 of each of the cartridge-type HDDs 200d, 200e, 200f are shaped like their respective waveforms which differ in wavelength; the wavelength of the first side surface 211 corresponds to the wavelength of the first inner wall surface 161; and the wavelength of the second side surface 212 corresponds to the wavelength of the second inner wall surface 162. Therefore, the position of each of the cartridge-type HDDs 200d, 200e, 200f inserted into the slot 150 is fixed. In addition, the slot is not symmetrical in any respect at all. When turned upside down, each of the cartridge-type HDDs 200d, 200e, 200f cannot be inserted into the slot 150. Accordingly, the wrong insertion is prevented.

Figure 6:
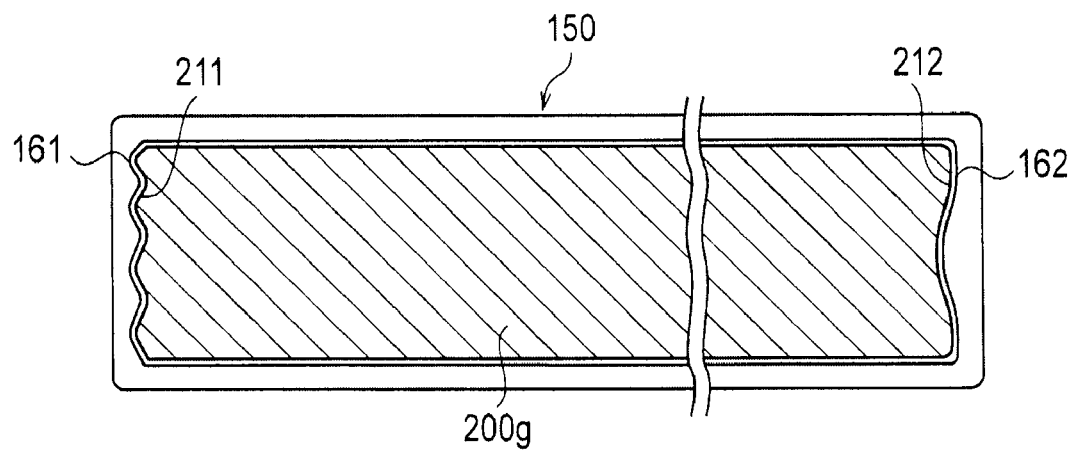
FIG. 6 is a diagram showing a third condition in which a cartridge-type HDD is inserted in the slot according to the embodiment of this invention.

It should be noted that, as shown in FIG. 6 which is a diagram showing a third condition in which a cartridge-type HDD 200g is inserted in the slot 150, the wavelengths of the first inner wall surface 161 and the second inner wall surface 162 of the slot 150 as well as the wavelengths of the first side surface 211 and the second side surface 212 of the cartridge-type HDD 200g may each change in such a predetermined way that the wavelength becomes shorter toward the top from the bottom, instead of being kept constant.

Figure 7:
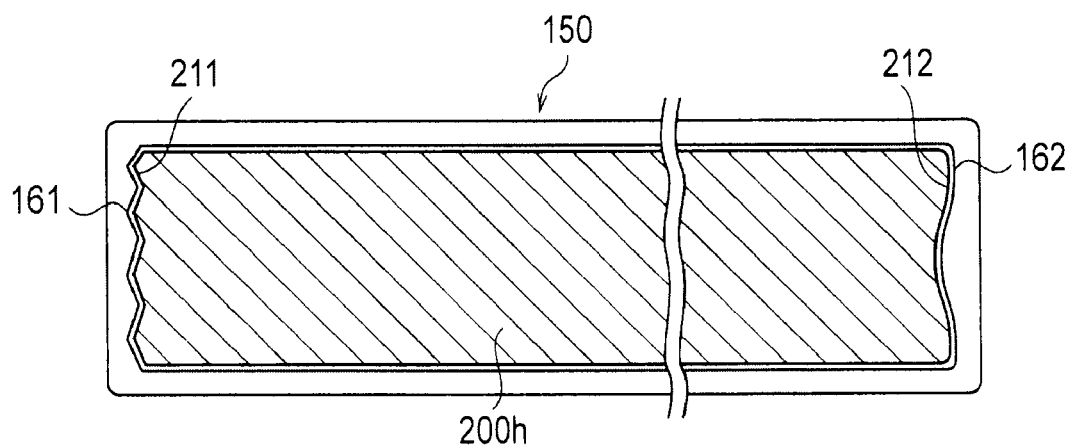
FIG. 7 is a diagram showing a fourth condition in which a cartridge-type HDD is inserted in the slot according to the embodiment of this invention.
Figure 8:
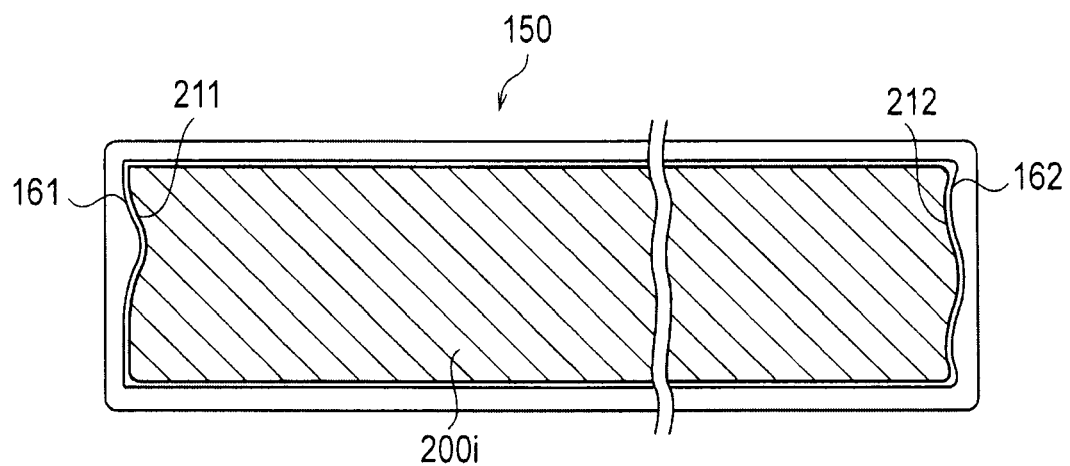
FIG. 8 is a diagram showing a fifth condition in which a cartridge-type HDD is inserted in the slot according to the embodiment of this invention.

Furthermore, it suffices to say that the inner wall surfaces of the slot 150 are asymmetrical, as shown in FIG. 7 which is a diagram showing a fourth condition in which a cartridge-type HDD 200h is inserted in the slot 150, or as shown in FIG. 8 which is a diagram showing a fifth condition in which a cartridge-type HDD 200i is inserted in the slot 150.

As described above, this invention naturally includes various embodiments which are not described herein. Accordingly, the technical scope of this invention should be determined only by the claims to be interpreted on the basis of the description.

The cartridge system according to this invention realizes the easy positioning of the cartridge in the course of insertion into the slot provided in the main body apparatus, and accordingly proves useful as a cartridge system.

What is claimed is:
1. A cartridge system comprising:
   a cartridge; and
   a main body apparatus having a slot into which cartridges different in thickness are insertable, wherein the slot comprises a first inner wall surface and a second inner wall surface facing the first inner wall surface, and further comprises a first protrusion provided on the first inner wall surface that projects laterally along the first inner wall surface to an opening of the slot, and the cartridge has such a shape that the surface of the cartridge facing the first inner wall surface does not collide with the first protrusion when the cartridge is inserted in the slot.

2. The cartridge system according to claim 1, wherein the cartridge comprises a first recess in the position corresponding to that of the first protrusion when the cartridge is inserted in the slot.

3. The cartridge system according to claim 1, wherein the first protrusion is located in such a position that it prevents the vertical movement of a cartridge inserted in the slot, the cartridge having the smallest thickness among the cartridges different in thickness.

4. The cartridge system according to claim 1, wherein
the slot further comprises a second protrusion on the second inner wall surface, and
the cartridge further comprises a second recess in the position corresponding to that of the second protrusion when the cartridge is inserted in the slot.

5. The cartridge system according to claim 4, wherein the first protrusion and the second protrusion are respectively provided on the inner wall surfaces of the slot in asymmetrical positions.

6. The cartridge system according to claim 1, wherein
the first inner wall surface is shaped like a waveform having a first wavelength,
the second inner wall surface is shaped like a waveform having a second wavelength which is different from the first wavelength,
a surface of the cartridge which faces the first inner wall surface when the cartridge is inserted in the slot is shaped like a waveform having a third wavelength corresponding to the first wavelength, and
a surface of the cartridge which faces the second inner wall surface when the cartridge is inserted in the slot is shaped like a waveform having a fourth wavelength corresponding to the second wavelength.

7. The cartridge system according to claim 6, wherein each of the first to fourth wavelengths is a wavelength which changes in a predetermined range.

8. The cartridge system according to claim 1, wherein the slot further comprises a third protrusion in one of its four corners, and
the cartridge further comprises a third recess in the position corresponding to that of the third protrusion when the cartridge is inserted in the slot.

9. The cartridge system according to claim 8, wherein the third protrusion is an optically-transparent member.

10. The cartridge system according to claim 1, wherein
the first inner wall surface is shaped like a waveform having a first wavelength, and
the second inner wall surface is shaped like a waveform having a second wavelength which is different from the first wavelength.

11. The cartridge system according to claim 10, wherein a surface of the cartridge which faces the first inner wall surface when the cartridge is inserted in the slot is shaped like a waveform having a third wavelength corresponding to the first wavelength.

12. The cartridge system according to claim 10, wherein a surface of the cartridge which faces the second inner wall surface when the cartridge is inserted in the slot is shaped like a waveform having a fourth wavelength corresponding to the second wavelength.

* * * * *